United States Patent
Li et al.

(10) Patent No.: US 11,272,169 B2
(45) Date of Patent: Mar. 8, 2022

(54) VIEWPOINT CONTROLLABLE THREE-DIMENSIONAL IMAGE DISPLAY APPARATUS AND METHOD FOR DISPLAYING THREE-DIMENSIONAL IMAGE

(71) Applicant: BOE Technology Group Co., Ltd., Beijing (CN)

(72) Inventors: Zhongxiao Li, Beijing (CN); Xue Dong, Beijing (CN); Xiaochuan Chen, Beijing (CN); Wenqing Zhao, Beijing (CN); Jinye Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 563 days.

(21) Appl. No.: 16/330,724

(22) PCT Filed: Aug. 31, 2018

(86) PCT No.: PCT/CN2018/103540
§ 371 (c)(1),
(2) Date: Mar. 5, 2019

(87) PCT Pub. No.: WO2019/085628
PCT Pub. Date: May 9, 2019

(65) Prior Publication Data
US 2021/0352265 A1    Nov. 11, 2021

(30) Foreign Application Priority Data

Nov. 1, 2017    (CN) .......................... 201711057350.1

(51) Int. Cl.
*H04N 13/315*    (2018.01)
*H04N 13/312*    (2018.01)
(Continued)

(52) U.S. Cl.
CPC ........... *H04N 13/315* (2018.05); *G02B 30/28* (2020.01); *G02B 30/31* (2020.01); *H04N 13/312* (2018.05); *H04N 13/398* (2018.05)

(58) Field of Classification Search
CPC .... G02B 30/27; G02B 30/30; G02B 27/0093; G02B 30/28; H04N 13/305; H04N 13/32;
(Continued)

(56) References Cited

U.S. PATENT DOCUMENTS 6,151,166 A * 11/2000 Matsushita .......... G02B 5/1814
349/5
9,654,766 B2    5/2017 Kim et al.
(Continued)

FOREIGN PATENT DOCUMENTS

CN        1841130 A      10/2006
CN      101840071 A       9/2010
(Continued)

OTHER PUBLICATIONS

International Search Report & Written Opinion dated Dec. 6, 2018, regarding PCT/CN2018/103540.
(Continued)

*Primary Examiner* — Peter D Le
(74) *Attorney, Agent, or Firm* — Intellectual Valley Law, P.C.

(57) ABSTRACT

The present application provides a viewpoint controllable three-dimensional image display apparatus. The viewpoint controllable three-dimensional image display apparatus includes a display panel having a light emitting side; a back light for providing a light source for image display in the display panel; a first grating on a side of the light emitting side distal to the back light; a second grating between the display panel and the back light; and a controller configured to alternately turn on and off the first grating and the second
(Continued)

grating in a time-division driving mode including a first mode and a second mode, thereby presenting a three-dimensional image to a user. In the first mode, the controller is configured to turn off the second grating, and turn on the first grating. In the second mode, the controller is configured to turn off the first grating, and turn on the second grating.

20 Claims, 12 Drawing Sheets

(51) Int. Cl.
  *G02B 30/28* (2020.01)
  *G02B 30/31* (2020.01)
  *H04N 13/398* (2018.01)
(58) Field of Classification Search
  CPC .. H04N 13/351; H04N 13/359; H04N 13/373; H04N 13/383; H04N 13/398; H04N 13/31; G02F 1/133603; G02F 1/133607; G02F 1/13471; G02F 2203/62; G09G 2320/0209; G09G 2320/0626; G09G 2320/068; G09G 2320/08; G09G 3/3406; G09G 3/342
  See application file for complete search history.

(56) References Cited

U.S. PATENT DOCUMENTS

| | | | |
|---|---|---|---|
| 2006/0215018 A1 | 9/2006 | Fukushima et al. | |
| 2007/0008619 A1* | 1/2007 | Cha | H04N 13/31 359/462 |
| 2009/0129058 A1* | 5/2009 | Tokita | G02B 6/0021 362/97.2 |
| 2011/0036612 A1* | 2/2011 | Jung | G02F 1/133308 174/50.5 |
| 2012/0242931 A1* | 9/2012 | Jung | G02F 1/13363 349/62 |
| 2012/0249924 A1* | 10/2012 | Li | G02F 1/133504 349/62 |
| 2012/0249934 A1* | 10/2012 | Li | G02B 5/1823 349/96 |
| 2013/0027909 A1 | 1/2013 | Kim et al. | |
| 2013/0271510 A1* | 10/2013 | Matsumoto | G02B 30/31 345/690 |
| 2015/0309319 A1* | 10/2015 | Wei | G02B 30/32 359/463 |
| 2016/0189639 A1* | 6/2016 | Liao | G09G 3/342 345/102 |
| 2018/0267359 A1* | 9/2018 | Niu | H04N 13/324 |

FOREIGN PATENT DOCUMENTS

| | | |
|---|---|---|
| CN | 102354071 A | 2/2012 |
| CN | 103246069 A | 8/2013 |
| CN | 105182554 A | 12/2015 |
| CN | 105842865 A | 8/2016 |
| CN | 106873170 A | 6/2017 |

OTHER PUBLICATIONS

First Office Action in the Chinese Patent Application No. 201711057350.1, dated Mar. 1, 2019; English translation attached.

* cited by examiner

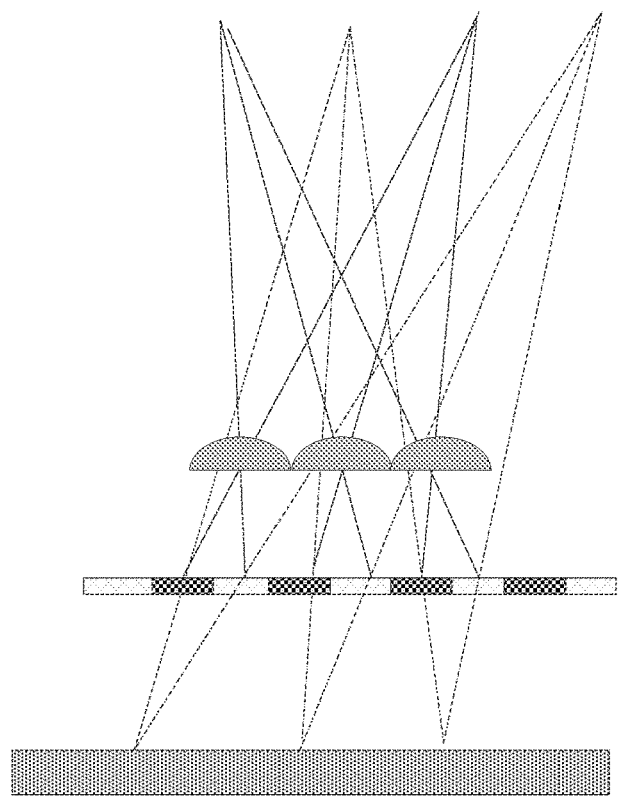
FIG. 2
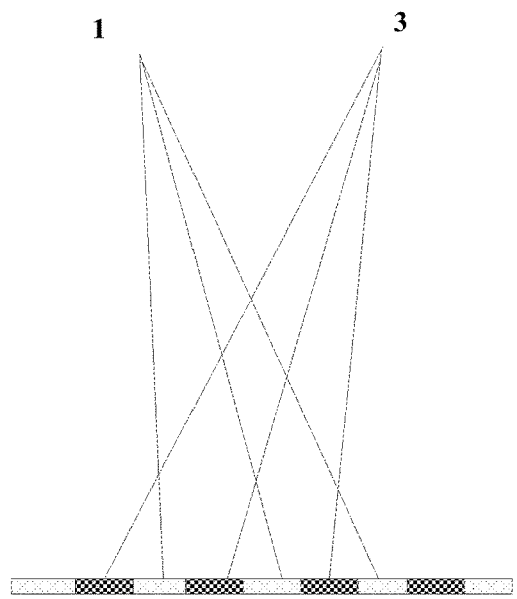
FIG. 3A

First grating

Display panle

Second grating

First grating

Display panle

Second grating

First grating

Display panle

Second grating

First grating

Display panle

Second grating

VIEWPOINT CONTROLLABLE THREE-DIMENSIONAL IMAGE DISPLAY APPARATUS AND METHOD FOR DISPLAYING THREE-DIMENSIONAL IMAGE

CROSS-REFERENCE TO RELATED APPLICATION

This application is a national stage application under 35 U.S.C. § 371 of International Application No. PCT/CN2018/103540, filed Aug. 31, 2018, which claims priority to Chinese Patent Application No. 201711057350.1, filed Nov. 1, 2017, the contents of which are incorporated by reference in the entirety.

TECHNICAL FIELD

The present invention relates to display technology, more particularly, to a viewpoint controllable three-dimensional image display apparatus, and a method for displaying a three-dimensional image.

BACKGROUND

In recent years, glasses-free three-dimensional display apparatuses have become a focus of research and development. Glasses-free three-dimensional display does not require special headgear or glasses to view the three-dimensional image. Typically, the glasses-free three-dimensional display apparatuses use either a parallax barrier grating or a lenticular lens grating. The glasses-free three-dimensional display apparatuses obviate the need of wearing a glass, making the viewing experience more pleasant and convenient.

SUMMARY

In one aspect, the present invention provides a viewpoint controllable three-dimensional image display apparatus, comprising a display panel having a light emitting side; a back light for providing a light source for image display in the display panel; a first grating on a side of the light emitting side distal to the back light; a second grating between the display panel and the back light; and a controller configured to alternately turn on and off the first grating and the second grating in a time-division driving mode comprising a first mode and a second mode, thereby presenting a three-dimensional image to a user; wherein the controller is configured to turn off the second grating, and turn on the first grating, in the first mode, thereby directing light emitted from the display panel into a plurality of first view points on a side of the first grating distal to the display panel; and the controller is configured to turn off the first grating, and turn on the second grating, in the second mode, thereby directing light emitted from the display panel into a plurality of second view points on a side of the first grating distal to the display panel.

Optionally, the controller is further configured to adjust a first viewpoint spacing between two directly adjacent view points of the plurality of first view points and a second viewpoint spacing between two directly adjacent view points of the plurality of second view points.

Optionally, the controller is further configured to adjust a first height between the first grating and the display panel, and a second height between the second grating and the display panel.

Optionally, the controller is further configured to adjust each of the first viewpoint spacing and the second viewpoint spacing to be greater than a first spacing; and the plurality of first view points and the plurality of second view points are configured to present a three-dimensional image to a user, when a first eye of the user is at a position corresponding to a first one of the plurality of first view points and a second eye of the user is at a position corresponding to a second one of the plurality of second view points, the first one of the plurality of first view points and the second one of the plurality of second view points being directly adjacent to each other.

Optionally, the controller is further configured to adjust each of the first viewpoint spacing and the second viewpoint spacing to be approximately twice that of the first spacing.

Optionally, the controller is further configured to adjust a first grating period of the first grating and adjust a second grating period of a second grating such that each view point of the plurality of first view points is spaced apart from any directly adjacent view point of the plurality of second view points by approximately the first spacing, and each view point of the plurality of second view points is spaced apart from any directly adjacent view point of the plurality of first view points by approximately the first spacing.

Optionally, the controller is further configured to adjust each of the first viewpoint spacing and the second viewpoint spacing to be less than a first spacing; and the plurality of first view points and the plurality of second view points are configured to present a three-dimensional image to a user, when a first eye of the user is at a position corresponding to a first one of the plurality of first view points and a second eye of the user is at a position corresponding to a second one of the plurality of second view points, the first one of the plurality of first view points and the second one of the plurality of second view points being spaced apart by one or more view points.

Optionally, the controller is further configured to adjust each of the first viewpoint spacing and the second viewpoint spacing to be substantially same as a first spacing; and the controller is further configured to translationally shift positions of a plurality of grating units of the first grating and positions of a plurality of grating units of the second grating relative to each other such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing.

Optionally, the controller is configured to translationally shift positions of a plurality of grating units of the first grating and positions of a plurality of grating units of the second grating relative to each other so that a position of each individual view point of the plurality of second view points move towards a position of a respective, directly adjacent, first view point of the plurality of first view points, and a position of each individual view point of the plurality of first view points move towards a position of a respective, directly adjacent, second view point of the plurality of second view points.

Optionally, the first spacing is an interpupillary distance of a human.

Optionally, the second spacing is a width of a pupil.

Optionally, each of the first grating and the second grating comprises N independently controllable grating units, N is a positive integer.

Optionally, each of the first grating and the second grating is a grating selected from a group consisting of a liquid crystal parallax barrier grating and a liquid crystal lens grating.

In another aspect, the present invention provides a method for displaying a three-dimensional image, comprising alternately turning on and off the first grating and the second grating in a time-division driving mode comprising a first mode and a second mode, thereby presenting the three-dimensional image to a user; in the first mode, the method comprises turning off the second grating; turning on the first grating; and directing light emitted from the display panel into a plurality of first view points on a side of the first grating distal to the display panel, by turning on a first grating on a side the light emitting side distal to a back light; in the second mode, the method comprises turning on the second grating; turning off the first grating; and directing light emitted from the display panel into a plurality of second view points on a side of the first grating distal to the display panel, by turning on a second grating between the display panel and the back light.

Optionally, the method further comprises adjusting a first viewpoint spacing between two directly adjacent view points of the plurality of first view points; and adjusting a second viewpoint spacing between two directly adjacent view points of the plurality of second view points.

Optionally, the method further comprises adjusting a first height between the first grating and the display panel; and adjusting a second height between the second grating and the display panel.

Optionally, the first height and the second height are adjusted so that a first normal distance between the plurality of first view points and the display panel is substantially same as a second normal distance between the plurality of second view points and the display panel.

Optionally, each of the first viewpoint spacing and the second viewpoint spacing is adjusted to be greater than a first spacing; and the method comprises presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being directly adjacent to each other.

Optionally, the method further comprises adjusting each of the first viewpoint spacing and the second viewpoint spacing to be approximately twice that of the first spacing.

Optionally, the method further comprises adjusting a first grating period of the first grating and adjusting a second grating period of a second grating such that each view point of the plurality of first view points is spaced apart from any directly adjacent view point of the plurality of second view points by approximately the first spacing, and each view point of the plurality of second view points is spaced apart from any directly adjacent view point of the plurality of first view points by approximately the first spacing.

Optionally, the method further comprises adjusting each of the first viewpoint spacing and the second viewpoint spacing to be less than a first spacing; and presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being spaced apart by one or more view points.

Optionally, the method further comprises adjusting each of the first viewpoint spacing and the second viewpoint spacing to be substantially same as a first spacing; and adjusting a first grating period of the first grating and adjusting a second grating period of a second grating such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing.

Optionally, adjusting the first grating period of the first grating and adjusting the second grating period of a second grating comprise moving a position of each individual view point of the plurality of second view points towards a position of a respective, directly adjacent, first view point of the plurality of first view points; and moving a position of each individual view point of the plurality of first view points towards a position of a respective, directly adjacent second view point of the plurality of second view points.

Optionally, the first spacing is an interpupillary distance of a human.

Optionally, the second spacing is a width of a pupil.

Optionally, each of the first grating and the second grating comprises N independently controllable grating units, N is a positive integer.

Optionally, each of the first grating and the second grating is a grating selected from a group consisting of a liquid crystal parallax barrier grating and a liquid crystal lens grating.

BRIEF DESCRIPTION OF THE FIGURES

The following drawings are merely examples for illustrative purposes according to various disclosed embodiments and are not intended to limit the scope of the present invention.

FIG. 2 is a schematic diagram illustrating the light path in a viewpoint controllable three-dimensional image display apparatus with a liquid crystal lens grating.

FIG. 3A is a schematic diagram illustrating the light path in a viewpoint controllable three-dimensional image display apparatus when a first grating is turned on.

FIG. 3B is a schematic diagram illustrating the light path in a viewpoint controllable three-dimensional image display apparatus when a second grating is turned on.

DETAILED DESCRIPTION

Figure 1:
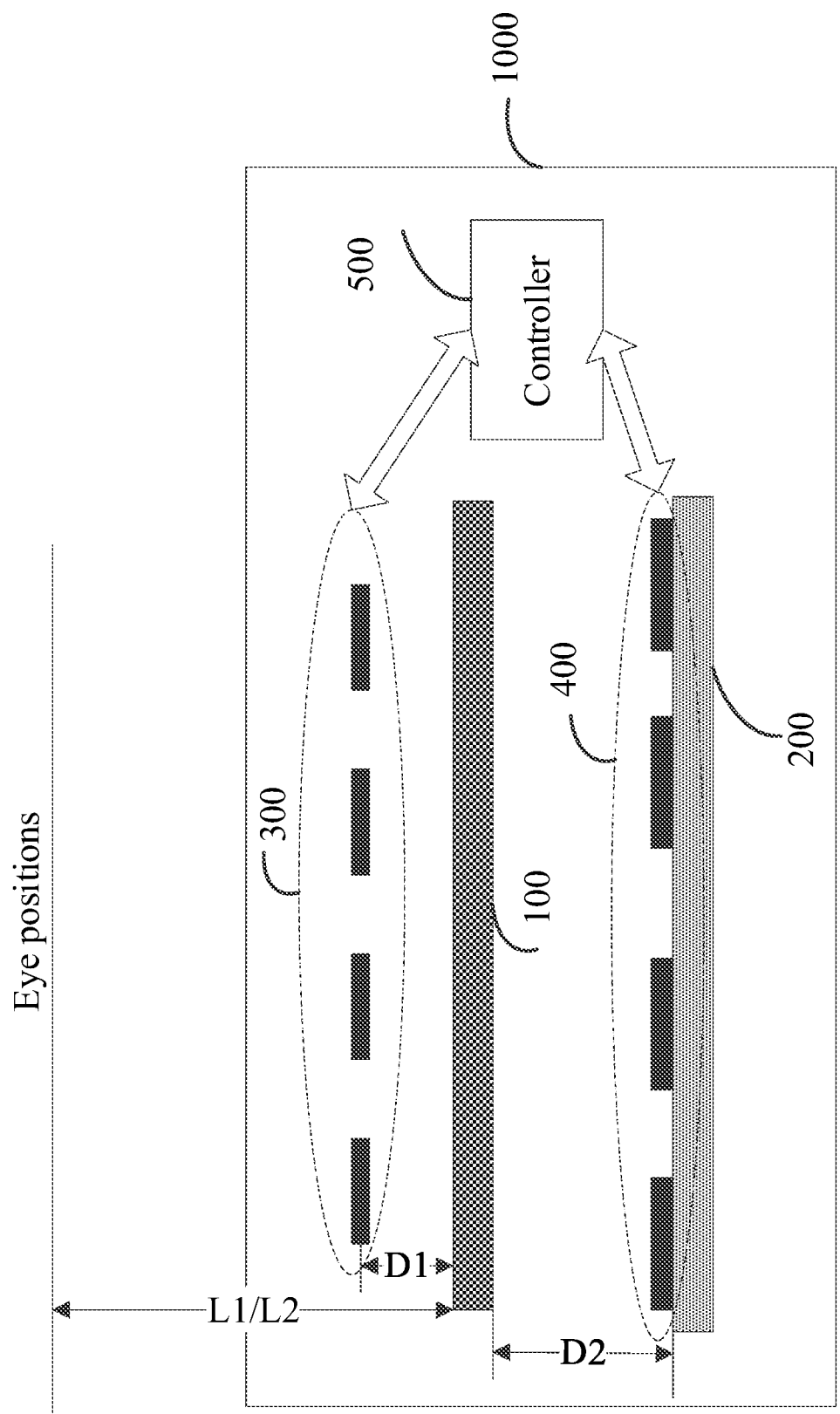
FIG. 1 is a schematic diagram illustrating the structure of a viewpoint controllable three-dimensional image display apparatus.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In general, a glasses-free three-dimensional display apparatus includes a two-dimensional display panel and a three-dimensional image presenting device (such as a grating). With the development of the technology of display panel, display panels entering the market have higher and higher PPI (Pixel Per Inch, the number of pixels obtained in every inch of display panel). An increase in PPI inevitably requires a distance between of the three-dimensional image presenting device and the display panel to be smaller. However, limited by the thickness of glass and the thickness of an optical clear adhesive layer, the distance between the three-dimensional image presenting device and the display panel cannot be easily adjusted to be smaller. It follows that in such a high-PPI display panel, the conditions for forming the three-dimensional image cannot be easily satisfied.

On the other hand, a lower-PPI display panel requires a distance between the three-dimensional image presenting device (e.g., a grating) and the display panel to be relatively large, often larger than a thickness of the layers combined in the lower-PPI display panel. To satisfy the conditions for forming the three-dimensional image, additional glass layer (s) are required in the display panel to increase the thickness of the layers so that the conditions for forming the three-dimensional image can be satisfied.

Accordingly, the present disclosure provides, inter alia, a viewpoint controllable three-dimensional image display apparatus, and a method for displaying a three-dimensional image that substantially obviate one or more of the problems due to limitations and disadvantages of the related art. In one aspect, the present disclosure provides a viewpoint controllable three-dimensional image display apparatus. In some embodiments, the viewpoint controllable three-dimensional image display apparatus includes a display panel having a light emitting side; a back light; a first grating on a side of the light emitting side distal to the back light; a second grating between the display panel and the back light; and a controller configured to alternately turn on and off the first grating and the second grating in a time-division driving mode including a first mode and a second mode, thereby presenting the three-dimensional image to a user. Optionally, the controller is configured to turn off the second grating, and turn on the first grating, in the first mode, thereby directing light emitted from the display panel into a plurality of first view points on a side of the first grating distal to the display panel. Optionally, the controller is configured to turn off the first grating, and turn on the second grating, in the second mode, thereby directing light emitted from the display panel into a plurality of second view points on a side of the first grating distal to the display panel.

FIG. 1 is a schematic diagram illustrating the structure of a viewpoint controllable three-dimensional image display apparatus. Referring to FIG. 1, a viewpoint controllable three-dimensional image display apparatus 1000 includes a display panel 100, and a back light 200 configured to provide a light source for image display in the display panel 100. Optionally, the display panel 100 is a liquid crystal display panel.

In some embodiments, the display panel 100 has a light emitting side (e.g. the light emitting side is between the display panel and the position of a user). A first grating 300 is disposed on a side of the light emitting side distal to the back light 200. For example, the first grating 300 is disposed between the display panel 100 and a viewer. A second grating 400 is disposed between the display panel 100 and the back light 200.

Various appropriate grating structures may be used for making the first grating 300 and the second grating 400. Examples of appropriate gratings include a grating made of metal, a grating made of resin, and a liquid crystal grating. Optionally, to achieve an enhanced controllability of the gratings, the first grating 300 and the second grating 400 are the liquid crystal gratings. Optionally, the first grating 300 is a liquid crystal parallax barrier grating. Optionally, the first grating 300 is a liquid crystal lens grating. Optionally, the second grating 400 is a liquid crystal parallax barrier grating. Optionally, the second grating 400 is a liquid crystal lens grating. FIG. 2 is a schematic diagram illustrating the light path in a viewpoint controllable three-dimensional image display apparatus with a liquid crystal lens grating.

In some embodiments, referring to FIG. 1, the viewpoint controllable three-dimensional image display apparatus 1000 further includes a controller 500 configured to alternately turn on and off the first grating 300 and the second grating 400 in a time-division driving mode including a first mode and a second mode. Optionally, the controller 500 is configured to turn off the second grating 400, and turn on the first grating 300, in the first mode, thereby directing light emitted from the display panel 100 into a plurality of first view points on a side of the first grating 300 distal to the display panel 100. Optionally, the controller 500 is configured to turn off the first grating 300, and turn on the second grating 400, in the second mode, thereby directing light emitted from the display panel 100 into a plurality of second view points on a side of the first grating 300 distal to the display panel 100. In some embodiments, the plurality of the first view points and the plurality of the second view points are configured to present a three-dimensional image to a user, when a first eye of the user is at a position corresponding to a first one of the plurality of first view points and a second eye of the user is at a position corresponding to a second one of the plurality of second view points. Therefore, a position of the first eye of the user corresponds to the first one of the plurality of first view points, and a position of the second eye of the user corresponds to the second one of the plurality of second view points. Positions of view points correspond to positions of eyes of the viewer.

In some embodiments, by alternatively turning on and off the first grating 300 and the second grating 400 in the time-division driving mode, the first eye of the user in the position corresponding to the first one of the plurality of the first view points sees a first image by the light emitting from the display panel 100, and the second eye of the user in the position corresponding to the second one of the plurality of the first view points sees a second image by the light emitting from the display panel 100, the first image seen by the first eye and the second image seen by the second eye present a three-dimensional image to a user.

In some embodiments, the controller 500 is further configured to adjust a first viewpoint spacing between two directly adjacent view points of the plurality of first view points and a second viewpoint spacing between two directly adjacent view points of the plurality of second view points. By adjusting the first viewpoint spacing and the second viewpoint spacing, the display apparatus can present a three-dimensional without the need of adjusting the distance between a three-dimensional presenting device (e.g., a grating structure) and the display panel in the display apparatus.

In some embodiments, a distance between the first grating 300 and the display panel 100 along a direction substantially perpendicular to the display panel 100 is denoted as a first height D1, a distance between the second grating 400 and the display panel 100 along a direction substantially perpendicular to the display panel 100 is denoted as a second height D2. The controller 500 is further configured to adjust the first height D1 and the second height D2. In some embodiments, a distance between the plurality of first view points and the display panel 100 along a direction substantially perpendicular to the display panel 100 is denoted as a first normal distance L1, and a distance between the plurality of second view points and the display panel 100 along a direction substantially perpendicular to the display panel 100 is denoted as a second normal distance L2. Optionally, in order to perform three-dimensional display, the first normal distance L1 is substantially same as the second normal distance L2. Optionally, the plurality of fast view points and the plurality of second view points are substantially co-planar.

In some embodiments, the first height D1 and the second height D2 can be adjusted to make sure that the first normal distance L1 substantially same as the second normal distance L2. In some embodiments, the first height D1 and the second height D2 are determined according to:

$$D1 = \frac{WpL1}{Q1 + Wp} \quad (1)$$

$$D2 = \frac{WpL2}{Q2 + Wp} \quad (2)$$

wherein D1 is the first height, D2 is the second height, Wp is a size of a subpixel, L1 is the first normal distance, L2 is the second normal distance, Q1 is the first viewpoint spacing, and Q2 is the second viewpoint spacing. According to the above equations (1) and (2), changes of the first viewpoint spacing Q1 and the second viewpoint spacing Q2 leads to changes of the first height D1 and the second height D2.

In some embodiments, the first height D1 and the second height D2 can be respectively adjusted to obtain different values of the first normal distance L1 and the second normal distance L2, respectively. In one example, in order to directly adjust the first height D1 and the second height D2, a driving motor is disposed on a casing of the viewpoint controllable three-dimensional image display apparatus 1000 and is connected to the first grating 300 and the second grating 400, and the controller 500 can adjust the first height D1 and the second height D2 through the driving motor. In some embodiments, when the first height D1 and the second height D2 are fixed, the first viewpoint spacing Q1 and the second viewpoint spacing Q2 can be respectively adjusted to adjust values of the first normal distance L and the second normal distance L2, respectively. Therefore, adjusting the first viewpoint spacing Q1 and the second viewpoint spacing Q2 obviates the needs of directly adjusting the first height D1 and the second height D2. Optionally, according to different application scenarios, different means are used to adjust the first viewpoint spacing Q1 and the second viewpoint spacing Q2. In one example, the first viewpoint spacing Q1 and the second viewpoint spacing Q2 are adjusted by adjusting the positions of light transmissive regions of the first grating 300 and the second grating 400 (e.g., when the first grating 300 and the second grating 400 are parallax barrier gratings).

FIG. 3A is a schematic diagram illustrating the light path in a viewpoint controllable three-dimensional image display apparatus when a first grating is turned on. Referring to FIG. 1 and FIG. 3A, in the first mode, the first grating 300 is turned on, and the second grating 400 is turned off. The plurality of first view points are presented including a first view point 1 and a third view point 3. Subpixels of the display panel 100 seen by the user in the position corresponding to the first view point 1 of the plurality of first view points are different from subpixels of the display panel 100 seen by the user in the position corresponding to the third view point 3 of the plurality of first view points.

Figure 3B:
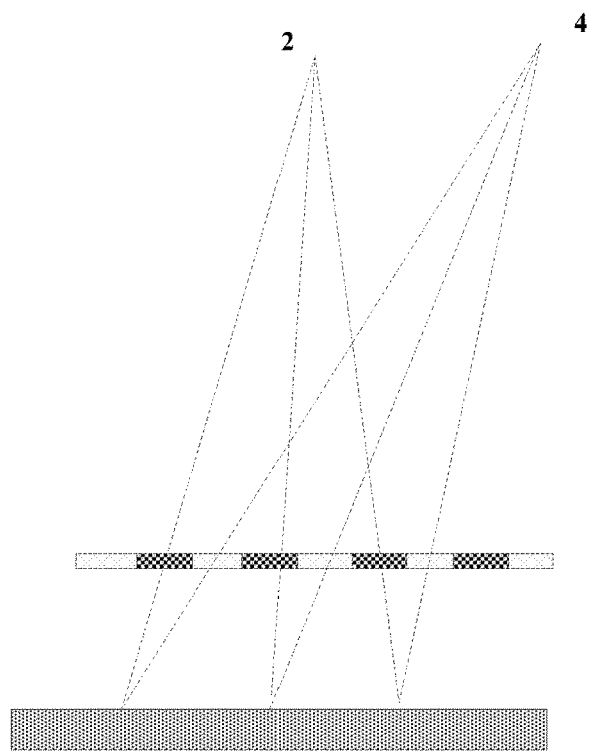

FIG. 3B is a schematic diagram illustrating the light path in a viewpoint controllable three-dimensional image display apparatus when a second grating is turned on. Referring to FIG. 1 and FIG. 3B, in the second mode, the first grating 300 is turned off, and the second grating 400 is turned on, thereby the plurality of second view points are presented including a second view point 2 and a fourth view point 4. Subpixels of the display panel 100 seen by the user in the position corresponding to the second view point 2 of the plurality of second view points are different from subpixels of the display panel 100 seen by the user in the position corresponding to the fourth view point 4 of the plurality of second view points.

Referring to FIG. 1, FIG. 3A, and FIG. 3B, in some embodiments, when only the first grating 300 is turned on, the number of the plurality of first view points is limited, thus providing the three-dimensional display under a more limiting condition. For example, the user will not see a three-dimensional image unless a viewpoint spacing between two directly adjacent view points of the plurality of first view points equals to an interpupillary distance of a human because in order to see a three-dimensional image, both of user's eyes should respective receives two different images formed by different subpixels of the display panel 100. Optionally, the interpupillary distance of a human is in a range of approximately 60 mm to approximately 70 mm, e.g., approximately 60 mm to approximately 62 mm, approximately 62 mm to approximately 64 mm, approximately 64 mm to approximately 66 mm, approximately 68 mm to approximately 70 mm. In some embodiments, when only the second grating 400 is turned on, the number of the plurality of second view points is limited, similarly providing the three-dimensional display under a more limiting condition. For example, the user will not see a three-dimensional image unless a viewpoint spacing between two directly adjacent view points of the plurality of second view points equals to the interpupillary distance of a human, because in order to see a three-dimensional image, both of user's eyes should respective receives two different images formed by different subpixels of the display panel 100.

In some embodiments, the first grating 300 and the second grating 400 operates in the time-division driving mode. In the first mode, the first grating 300 is turned on, and the second grating 400 is turned off. The first eye of the user in a position corresponding to the first one of the plurality of first view points sees light emitted from the display panel 100 into the plurality of first view points, thereby the first eye of the user sees a first image. In the second mode, the first grating 300 is turned off, and the second grating 400 is turned on. The second eye of the user in a position corresponding to the second one of the plurality of second view points sees light emitting from the display panel 100 into the plurality of second view points, thereby the second eye of the user see a second image. Based on the persistence of vision, the first image and the second image combine and present a three-dimensional image to the user. Since the plurality of first view points includes the first view point 1 and the third view point 3, and the plurality of second view points includes the second view point 2 and the fourth view point 4, the user has more choices of combining different images respectively corresponding to different view points to form a three-dimensional image.

In some embodiments, in order to have the persistence of vision to present the three-dimensional display, a frequency of switching between the first mode and the second mode is no less than 120 Hz, e.g., no less than 144 Hz, no less than 240 Hz. Examples of appropriate frequencies of switching between the first mode and the second mode include 120 Hz, 144 Hz, and 240 Hz. Optionally, the display panel 100 has a refresh rate no less than 120 Hz, e.g., no less than 144 Hz, no less than 240 Hz. Examples of appropriate refresh rates include 120 Hz, 144 Hz, and 240 Hz.

Figure 3C:
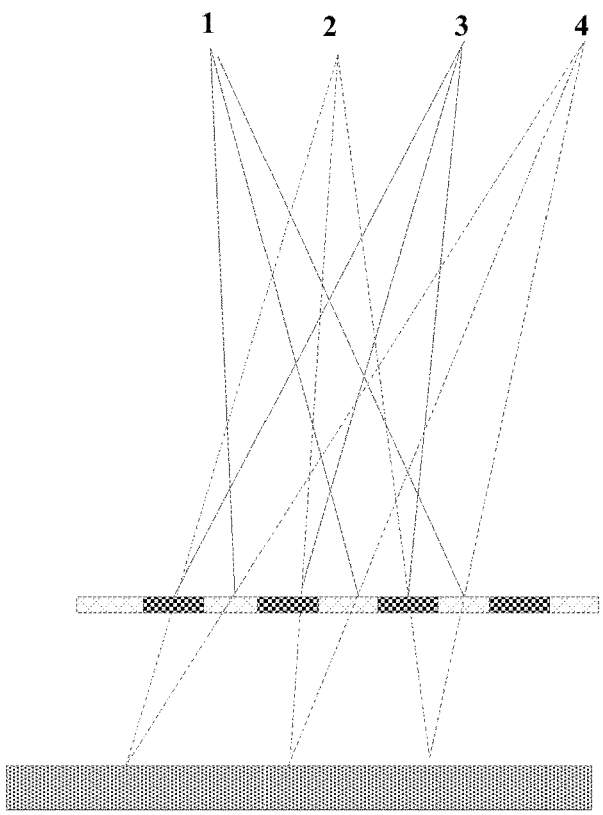
FIG. 3C is a schematic diagram illustrating the light path in a viewpoint controllable three-dimensional image display apparatus when a first grating and a second grating cooperatively operate.

FIG. 3C is a schematic diagram illustrating the light path in a viewpoint controllable three-dimensional image display apparatus when a first grating and a second grating cooperatively operate. The controller 500 is configured to alternately turn on and off the first grating 300 and the second grating 400 in the time-divisional driving mode including the first mode and the second mode. In the first mode, the first grating 300 is turned on, and the second grating 400 is turned off, a plurality of first view points including the first view point 1 and the third view point 3 are presented. In the second mode, the first grating 300 is turned off, and the second grating 400 is turned on, a plurality of second view points including the second view point 2 and the fourth view point 4 are presented. A first view point image seen in the position corresponding to the first view point 1, a second view point image seen in the position corresponding to the second view point 2, a third view point image seen in the position corresponding to the third view point 3, and a fourth view point image seen in the position corresponding to the fourth view point 4 are different from each other. Accordingly, the user can view a three-dimensional image by viewing at any two adjacent images (e.g., any two directly adjacent images) of the first view point image, the second view point image, the third view point image, and the fourth view point image, due to the persistence of vision and high frequencies switching between the first mode and the second mode. As long as the distance between any two of the view points being viewed by the user is substantially the same as an interpupillary distance of the user, the first eye of the user and the second eye of the user receive different images, the user's brain will combine those images together and sees the three-dimensional display.

In some embodiments, referring to FIG. 1, the PPI of the display panel 100 is relatively low, for example, the PPI of the display panel of TV is relatively low. A distance between a grating of a three-dimensional display device and a display panel should be relatively long. In order to have a relatively long distance between the grating of the three-dimensional display device and the display panel, extra glasses or other device should be added to reach the distance requirement. Thus, the display panel with low PPI is relatively thick so that it can have a relatively long distance between the grating and the display panel to perform three-dimensional display.

To obviate a relatively thick display apparatus having a display panel with a low PPI, in some embodiments, the controller 500 is further configured to adjust each of the first viewpoint spacing and the second viewpoint spacing to be greater than a first spacing. Optionally, the first spacing is an interpupillary distance of a human. Optionally, the interpupillary distance of a human is in a range of approximately 60 mm to approximately 70 mm, e.g., approximately 60 mm to approximately 62 mm, approximately 62 mm to approximately 64 mm, approximately 64 mm to approximately 66 mm, approximately 68 mm to approximately 70 mm. In the time driving mode including the first mode and the second mode, the first grating 300 and the second grating 400 are alternately turned on and off. When the first eye (e.g., a left eye) of the user is at the position corresponding to the first one of the plurality of first view point and the second eye (e.g., a right eye) of the user is at the position corresponding to the second one of the plurality of second view points, the first one of the plurality of first view point and the second one of the plurality of second view points together presents a three-dimensional image to a user.

For a normal three-dimensional display apparatus including only one grating, a viewpoint spacing between two directly adjacent view points of the plurality of viewpoints should be the interpupillary distance of human in order for the user to see a three-dimensional image. In other words, the viewpoint spacing between two directly adjacent view points of the plurality of viewpoints should not be greater than the interpupillary distance of human.

Referring to the equation (1) and equation (2), when the first viewpoint spacing Q1 increases, Q1+Wp also increases, thereby the first height D1 decreases; when the second viewpoint spacing Q2 increases, Q2+Wp also increases, and the second height D2 decreases. In some embodiments of the present disclosure, among the plurality of first view point and the plurality of second view point, as long as the distance between any two view points (either directly adjacent or spaced apart by other view point(s)) selected from a group consisting of the plurality of first view point and the plurality of second view point substantially equals to the interpupillary distance of human, the user can see the three-dimensional image. Therefore, the first viewpoint spacing Q1 and the second viewpoint spacing Q2 can be greater than the interpupillary distance of human. The first height D1 and the second height D2 can be smaller because the first viewpoint spacing Q. and the second viewpoint spacing Q2 can be greater than the interpupillary distance of human.

Figure 4A:
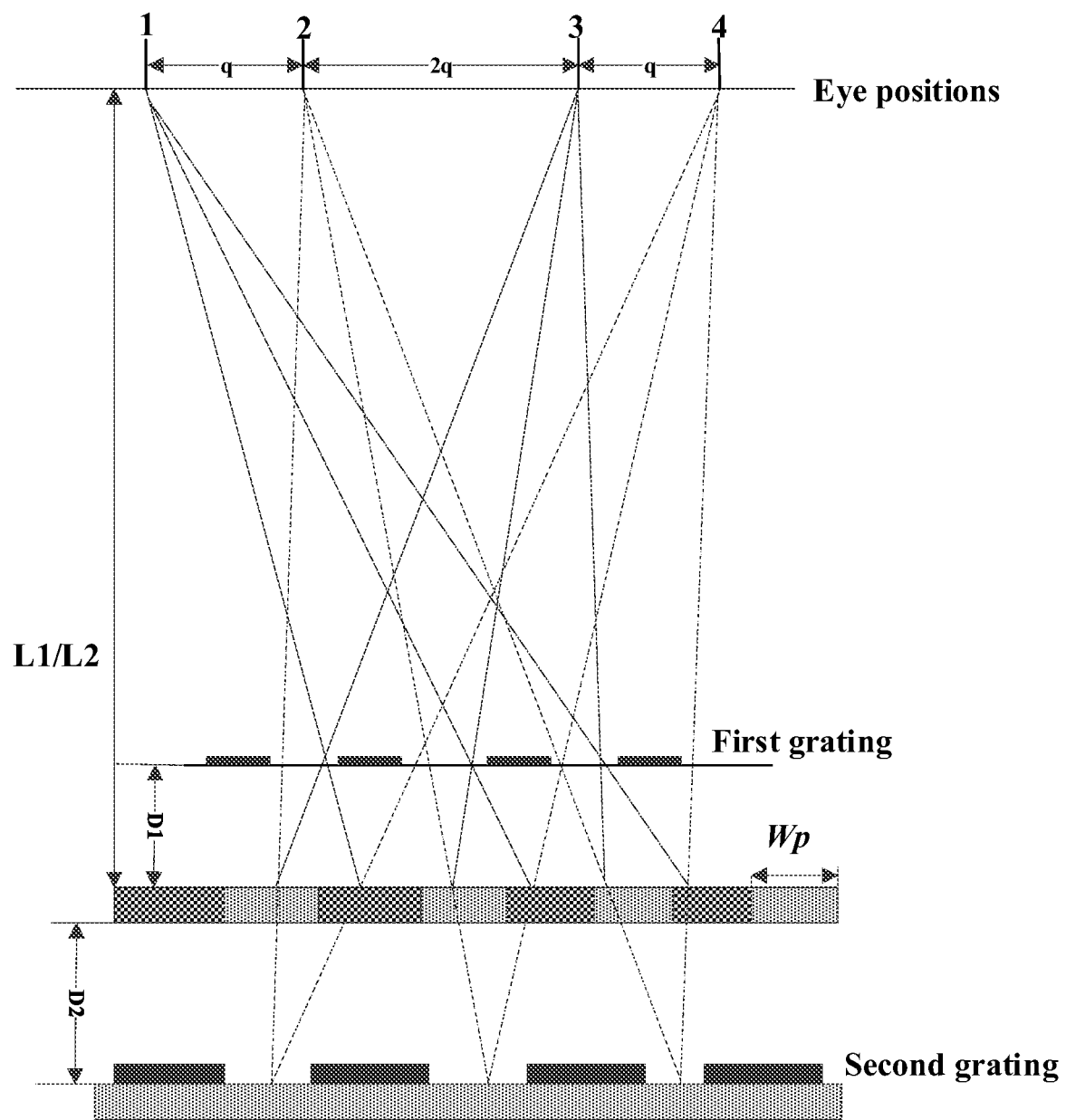
FIG. 4A is a schematic diagram illustrating the light path in a viewpoint controllable three-dimensional image display apparatus.

FIG. 4A is a schematic diagram illustrating the light path in a viewpoint controllable three-dimensional image display apparatus. In one example, referring to FIG. 1 and FIG. 4A, in the first mode, the first grating 300 is turned on, and the second grating 400 is turned off, thereby the plurality of first view points including the first view point 1 and the third view point 3 are presented. In the second mode, the first grating 300 is turned off, and the second grating 400 is turned on, thereby the plurality of second view points including the second view point 2 and the fourth view point 4 are presented. Optionally, the first viewpoint spacing Q1 is 3 times the interpupillary distance of human q, the second viewpoint spacing Q2 is 3 times the interpupillary distance of human q. In one example, the distance between the first view point 1 of the plurality of first view points and the second view point 2 of the plurality of second view points is the interpupillary distance of human q; the distance between the third view point 3 of the plurality of first view points and the fourth view point 4 of the plurality of second view points is the interpupillary distance of human q. When the first eye of the user is in the position corresponding to the first view point 1, and the second eye of the user is in the position corresponding to the second view point 2, the user can see the three-dimensional image. When the first eye of the user is in the position corresponding to the third view point 3, and the second eye of the user is in the position corresponding to the fourth view point 4, the user can also see the three-dimensional image. However, because the distance between the second view point 2 and the third view point 3 is greater than the interpupillary distance of human q, the user's eyes cannot be at the positions corresponding to the second view point 2 and the third view point 3 to view the three-dimensional image. When the user's eyes are at positions between the position corresponding to the second view point 2 and the position corresponding to the third view point 3, the user will not be able to see the three-dimensional image, which makes some of the combination of the view points useless.

In order to make fully use of the view points, in some embodiments, the controller 500 is configured to adjust each of the first view point spacing and the second view point spacing to be 2 times the first spacing (e.g. 2 times the interpupillary distance of human q). Optionally, a first grating period of the first grading and a second grating period of the second grating are adjusted such that each view point of the plurality of first view points is spaced apart from any directly adjacent view point of the plurality of second view points by approximately the first spacing, and each view point of the plurality of second view point is spaced apart from any directly adjacent view point of the plurality of first view points by approximately the first spacing.

The first grating period and the second grating period can be adjusted according to Equation (3) and Equation (4):

$$Ws1 = \frac{2Q1Wp}{Q1 + Wp} \quad (3)$$

$$Ws2 = \frac{2Q2Wp}{Q2 + Wp} \quad (4)$$

wherein Ws1 is the first grating period, Ws2 is the second grating period, Wp is a size of a subpixel, Q1 is the first viewpoint spacing, and Q2 is the second viewpoint spacing.

Figure 4B:
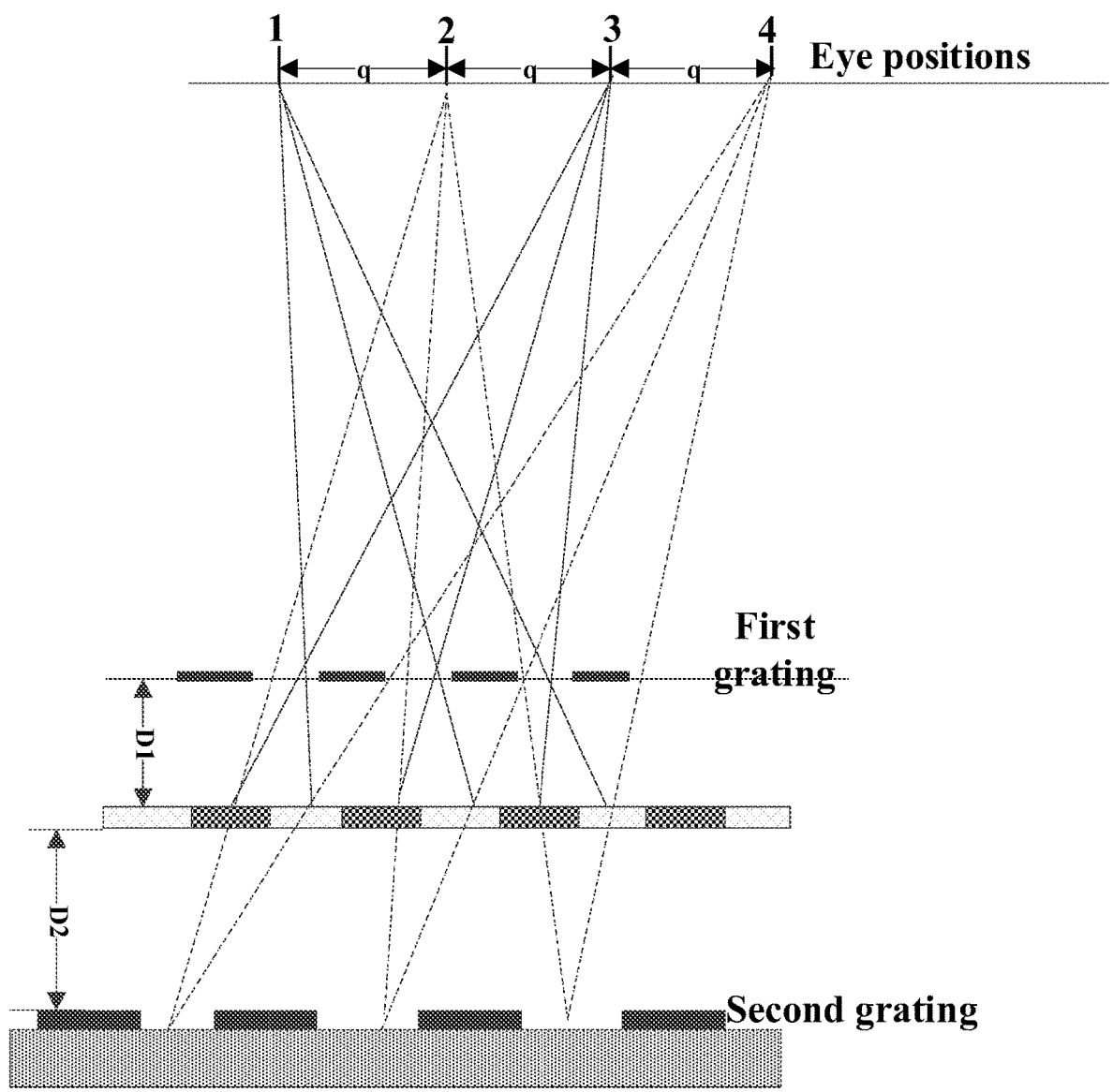
FIG. 4B is a schematic diagram illustrating the light path in a viewpoint controllable three-dimensional image display apparatus.

FIG. 4B is a schematic diagram illustrating the light path in a viewpoint controllable three-dimensional image display apparatus. Referring to FIG. 4B, when the distance between the first view point 1 of the plurality of first view points and the third view point 3 of the plurality of first view points is approximately 2 times the interpupillary distance of a human q, and the distance between the second view point 2 of the plurality of second viewpoints and the fourth view point 4 of the plurality of second view points is approximately 2 time the interpupillary distance of a human q, a distance of any two directly adjacent view points among the first view point 1, the second view point 2, the third view point 3, the fourth view point 4 is approximately the interpupillary distance of a human q, for example the distance between the first view point 1 and the second view point 2 is the interpupillary distance of a human q, the distance between the second view point 2 and the third view point 3 is the interpupillary distance of a human q, the distance between the third view point 3 and the fourth view point 4 is the interpupillary distance of a human q. Therefore, any two directly adjacent view points can present the three-dimensional image to the user. The first view point image seen in the position corresponding to the first view point 1 of the plurality of first view points, the second view point image seen in the position corresponding to the second view point 2 of the plurality of second view points, the third view point image seen in the position corresponding to the third view point 3 of the plurality of first view points, and the fourth view point image seen in the position corresponding to the fourth view point 4 of the plurality of second view points are different from each other. The first view point image and the second view point image can together present a three-dimensional image to the user. The second view point image and the third view point image can together present a three-dimensional image to the user. The third view point image and the fourth view point image can together present a three-dimensional image to the user.

In some embodiments, referring to FIG. 1, the PPI of the display panel 100 is relatively high, for example, the PPI of the display panel of a mobile phone is relatively high. Thus, a distance between a grating of a three-dimensional display device and a display panel should be relatively small to satisfy the condition for presenting a three-dimensional image. Limited by the fabrication technique, a thickness of layers in a high-PPI display panel is greater than the distance required for satisfying the condition for presenting a three-dimensional image.

To present a three-dimensional image in a high-PPI display apparatus, in some embodiments, the controller 500 is further configured to adjust each of the first viewpoint spacing and the second viewpoint spacing to be smaller than the first spacing. Optionally, the first spacing is the interpupillary distance of a human. Optionally, the interpupillary distance of a human is in a range of approximately 60 mm to approximately 70 mm, e.g., approximately 60 mm to approximately 62 mm, approximately 62 mm to approximately 64 mm, approximately 64 mm to approximately 66 mm, approximately 68 mm to approximately 70 mm. In the time driving mode including the first mode and the second mode, the first grating 300 and the second grating 400 is alternately turned on and off. When the first eye (e.g., a left eye) of the user is at the position corresponding to the first one of the plurality of first view point and the second eye (e.g., a right eye) of the user is at the position corresponding to the second one of the plurality of second view points, the first one of the plurality of first view point and the second one of the plurality of second view points together presents a three-dimensional image to a user.

For a normal three-dimensional display apparatus including only one grating, a viewpoint spacing between two directly adjacent view points of the plurality of viewpoints should be the interpupillary distance of human, thereby user can see a three-dimensional image. In other words, the viewpoint spacing between two directly adjacent view points of the plurality of viewpoints should not be smaller than the interpupillary distance of human.

Referring to the equation (1) and equation (2), when the first viewpoint spacing Q1 deceases, Q1+Wp also deceases, thereby the first height D1 increases; when the second viewpoint spacing Q2 decreases, Q2+Wp also decreases, thereby the second height D2 increases. In some embodiments, among the plurality of first view point and the plurality of second view point, as long as the distance between any two view points selected from a group consisting of the plurality of first view point and the plurality of second view point equals to the interpupillary distance of human, the user can see the three-dimensional image. Therefore, the first viewpoint spacing Q1 and the second viewpoint spacing Q2 can be smaller than the interpupillary distance of human. Therefore, the first height D1 and the second height D2 can be greater because the first viewpoint spacing Q1 and the second viewpoint spacing Q2 can be smaller than the interpupillary distance of human.

Figure 5:
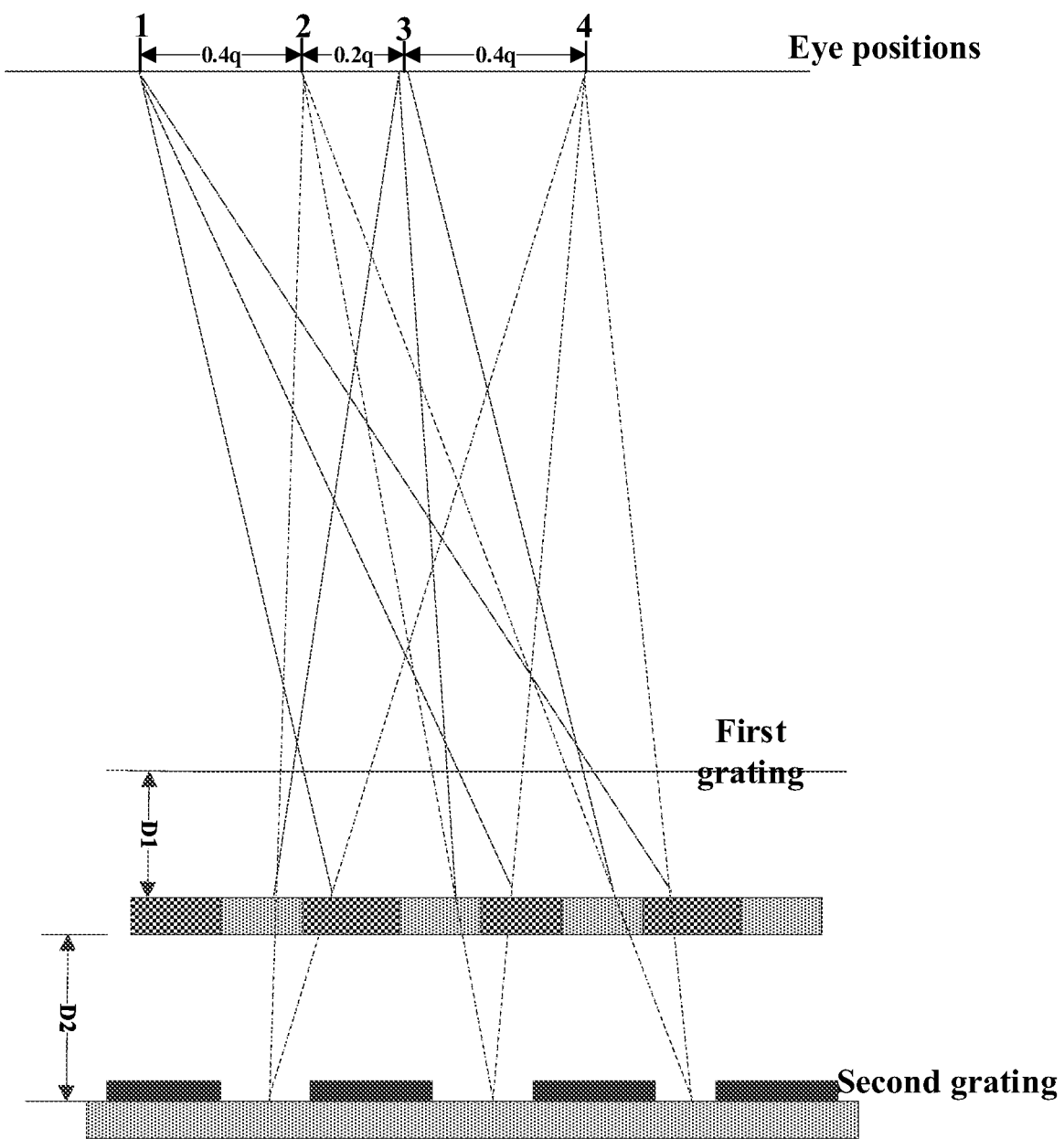
FIG. 5 is a schematic diagram illustrating the light path in a viewpoint controllable three-dimensional image display apparatus.

FIG. 5 is a schematic diagram illustrating the light path in a viewpoint controllable three-dimensional image display apparatus. In one example, referring to FIG. 1 and FIG. 5, in the first mode, the first grating 300 is turned on, and the second grating 400 is turned off, thereby the plurality of first view points are presented including the first view point 1 of the plurality of first view points and the third view point 3 of the plurality of first view points. In the second mode, the first grating 300 is turned off and the second grating 400 is turned on, thereby the plurality of second view points are presented including the second view point 2 of the plurality of second view points and the fourth view point 4 of the plurality of second view points. Optionally, referring to FIG. 5, the first viewpoint spacing Q1 is 0.6 times the interpupillary distance of human q, the second viewpoint spacing Q2 is 0.6 times the interpupillary distance of human q. In one example, the distance between the first view point 1 of the plurality of first view points and the second view point 2 of the plurality of second view points is 0.4 times the interpupillary distance of human q; the distance between the second view point 2 of the plurality of second view points and the third view point 3 of the plurality of first view points is 0.2 times the interpupillary distance of human q, the distance between the third view point 3 of the plurality of first view points and the fourth view point 4 of the plurality of second view points is 0.4 times the interpupillary distance of human q, therefore the distance between the first view point 1 of the plurality of the first view points and the fourth view point 4 of the plurality of second view points is the interpupillary distance of human q. Because the first eye of the user is in the position corresponding to the first view point 1, and the second eye of the user is in the position corresponding to the fourth view point 4, the user can see the three-dimensional image.

The positions of the eyes of the user may be changed in real time, while the best viewpoint to see the three-dimensional image is relatively fixed. When the positions of eyes of the user changes, the positions of eyes do not correspond to the positions of viewpoints presenting three-dimensional image, resulting in disturbance. To reduce disturbance in viewing the three-dimensional image when the user moves, in some embodiments, the positions of the grating can be adjusted based on a change in the positions of the eyes of the user. For example, when the positions of the eyes of the user changes, the pixels of the display panel seen by the user changes, and the positions of the eyes do not match with the position of the grating and the best view point of the display panel. In one example, the first eye of the user may see some of subpixels of the display panel which should only been seen by the second eye of the user, the image seen by the first eye is severely disturbed. In another example, the first eye of the user may only see some of the subpixels of the display panel, the image seen by the first eye is incomplete, which leads to a poor quality of the three-dimensional display.

In some embodiments, referring to FIG. 1, when the position of the first eye of the user deviates from the position corresponding to one of the plurality of first view points by a first deviation distance, the controller 500 is configured to adjust the first grating period of the first grating, such that the user can still see the three-dimensional image. Optionally, the controller 500 is configured to translationally shift positions of a plurality of grating units of the first grating (e.g., translationally shift positions of a plurality of barriers and a plurality of slits of the first grating) by a distance, e.g., translationally shift the positions of a plurality of grating units of the first grating by one-M-th of the first grating period of the first grating, such that the user can still see the three-dimensional image. Optionally, M is a positive integer. Optionally, M is correlated to the first deviation distance. In some embodiments, when the position of the second eye of the user deviates from the position corresponding to one of the plurality of second view points by a second deviation distance, the controller 500 is configured to adjust the second grating period of the second grating, such that the user can still see the three-dimensional image. Optionally, the controller 500 is configured to translationally shift positions of a plurality of grating units of the second grating (e.g., translationally shift positions of a plurality of barriers and a plurality of slits of the second grating) by a distance, e.g., translationally shift the positions of a plurality of grating units of the second grating by one-N-th of the second grating period of the second grating, such that the user can still see the three-dimensional image. Optionally, N is a positive integer. Optionally, N is correlated to the second deviation distance. Optionally, M=N.

Optionally, based on different application scenarios, different means are adopted to locate the positions of eyes of the user. In one example, eye tracking technology can be used to location the positions of eyes of the user. In another example, when it is detected that each of the first deviation distance and the second deviation distance has a value a, the controller 500 is configured to translationally shift the positions of a plurality of grating units of the first grating by 1/b of the first grating period of the first grating and translationally shift the positions of a plurality of grating units of the second grating by 1/b of the second grating period of the second grating.

In some embodiments, in order to adjust the position of the first grating and the position the second grating, each of the first grating and the second grating includes a number of independent controllable grating units. Based on the deviation distance of the user, the independent controllable grating units are separately controlled.

The present viewpoint controllable three-dimensional image display apparatus adopts a structure of two layers of gratings including the first grating and the second grating. The viewpoint controllable three-dimensional image display apparatus also adopts the time-division driving mode including the first mode and the second mode. In the first mode, the first grating is turned on and the second grating is turned off, light emits the display panel into the plurality of first view points. In the second mode, the first grating is turned off and the second grating is turned on, light emits from the plurality of second pixels of the display panel into the plurality of second view points. When the distance between two view points selected from a group consisting of the plurality of the first view points and the plurality of the second view points equals to the interpupillary distance of a human, the user can see the three-dimensional display. In some embodiment, the display panel has low PPI, the resolution of three-dimensional image seen by the user is the half of the resolution of the display panel, the distance between the gratings and the display panel can be smaller, which can decease the thickness of the display apparatus. In some embodiment, the display panel has high PPI, the distance between the gratings and the display panel can be greater, which will not reach the minimum value of the thickness of the glasses being produced at present. In some embodiments, the controller is configured to adjust the first grating period of the first grating and the second grating period of the second grating, thereby respectively adjusting the first viewpoint spacing and the second viewpoint spacing so that the user can see three-dimensional image based on the time-division driving mode. By adjusting the first viewpoint spacing and the second viewpoint spacing, the viewpoint controllable three-dimensional image display apparatus can present three-dimensional display in different scenarios, which reduces difficulty to present three-dimensional display and improve the utility.

In some embodiments, according to the principles of the light field display based on the glasses-free three-dimensional display, in the light field display, one eye of the user sees two different images so that a three-dimensional image is presented to the user. Optionally, in the viewpoint controllable three-dimensional image display apparatus, a distance between any two view points selected from a group consisting of the plurality of the first view points and the plurality of the second view points is smaller than a width of a pupil of a human. Optionally, the width of a pupil is in a range of approximately 2 mm to approximately 5 mm, e.g., approximately 2 mm to approximately 3 mm, approximately 3 mm to approximately 4 mm, approximately 4 mm to approximately 5 mm. Therefore, one eye of the user will receive two different images and see a three-dimensional image.

In some embodiments, referring to FIG. 1, the controller 500 is configured to adjust each of the first viewpoint spacing and the second viewpoint spacing to be substantially same as a first spacing. Optionally, the first spacing is the interpupillary distance of a human. In one example, the interpupillary distance of a human is in a range of approximately 60 mm to approximately 70 mm, e.g., approximately 60 mm to approximately 62 mm, approximately 62 mm to approximately 64 mm, approximately 64 mm to approximately 66 mm, approximately 68 mm to approximately 70 mm. Optionally, the controller 500 is further configured to adjust a first grating period of the first grating and adjust a second grating period of a second grating such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing. Optionally, the second spacing is the width of a pupil, therefore, each eye of the user receives two different images which present the user with a three-dimensional image.

In one example, the second spacing is the width of a pupil, the controller 500 is configured to adjust each of the first grating period of the first grating 300 and the second grating period of the second grating 400. Optionally, the controller 500 is configured to adjust the first grating period of the first grating 300 and the second grating period of the second grating 400 so that a position of each individual view point of the plurality of second view points move towards a position of a respective, directly adjacent, first view point of the plurality of first view points. Optionally, the controller 500 is configured to adjust the first grating period of the first grating 300 and the second grating period of the second grating 400 so that a position of each individual view point of the plurality of first view points move towards a position of a respective, directly adjacent, second view point of the plurality of second view points. Accordingly, each view point of the plurality of first view points is adjusted to be spaced apart from one directly adjacent view point of the plurality of second view points by a distance less than the width of a pupil, and each view point of the plurality of second view points is adjusted to be spaced apart from one directly adjacent view point of the plurality of first view points by a distance less than the second spacing.

Figure 6A:
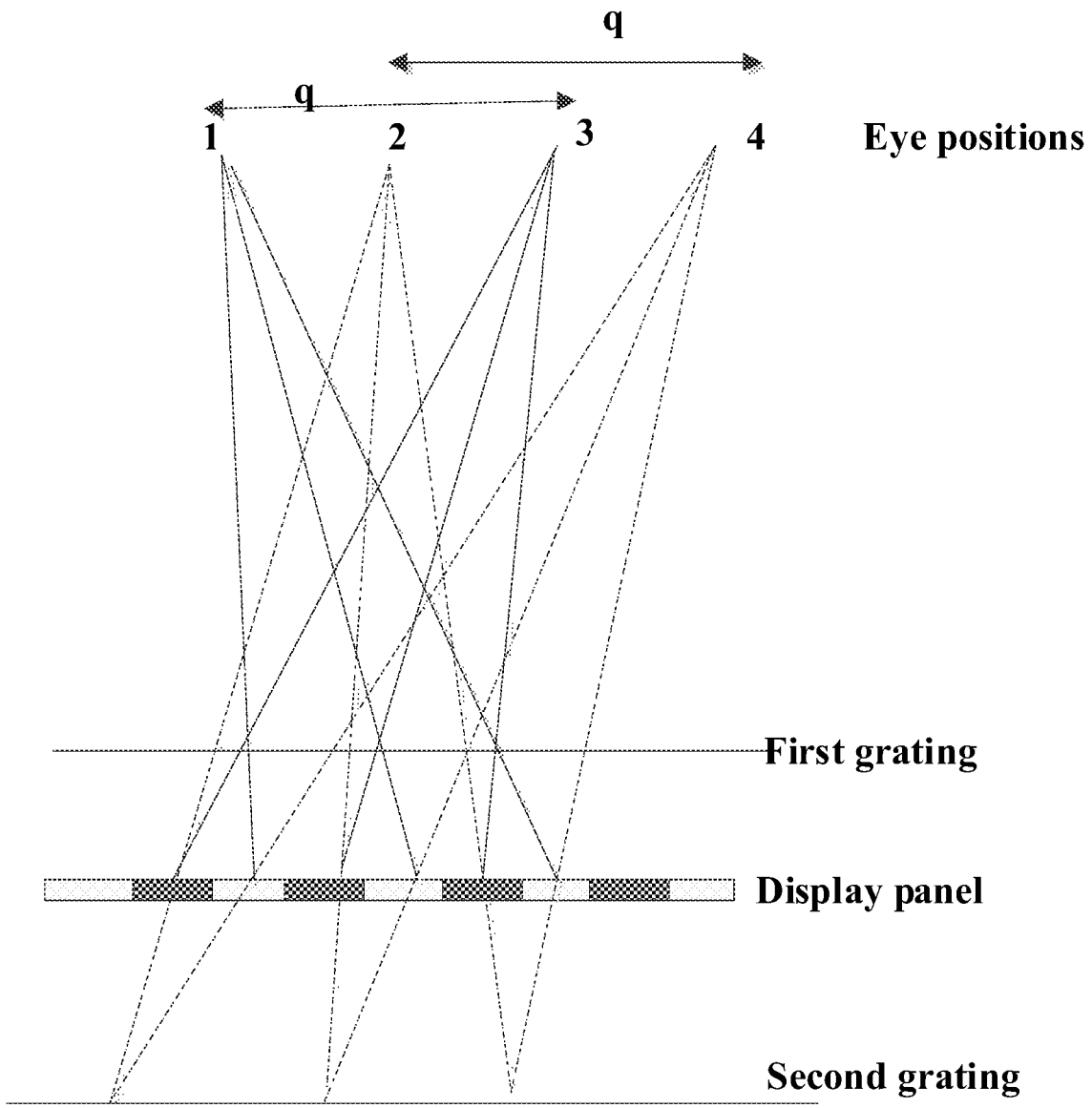
FIG. 6A is a schematic diagram illustrating the light path in a viewpoint controllable three-dimensional image display apparatus.

FIG. 6A is a schematic diagram illustrating the light path in a viewpoint controllable three-dimensional image display apparatus. Referring to FIG. 1 and FIG. 6A, the first grating 300 presents the plurality of first view points including the first view point 1 and the third view point 3. The second grating 400 presents the plurality of second view points including the second view point 2 and the fourth view point 4. Optionally, the first viewpoint spacing Q1 between two directly adjacent first view points of the plurality of first view points is adjusted to be substantially same as the interpupillary distance of a human. Optionally, the second viewpoint spacing Q2 between two directly adjacent second view points of the plurality of second view points is adjusted to be substantially same as the interpupillary distance of a human.

Figure 6B:
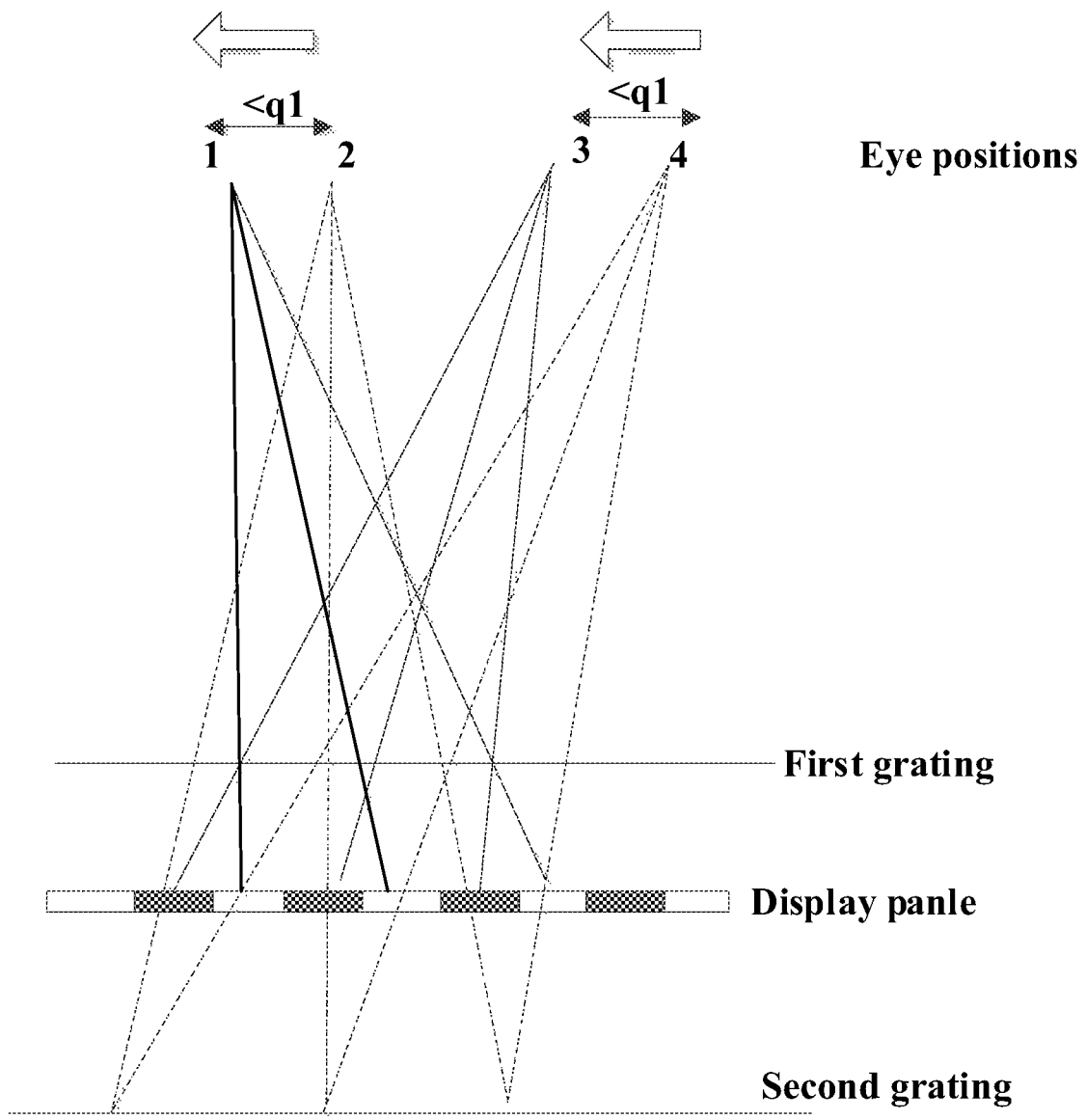
FIG. 6B is a schematic diagram illustrating the light path in a viewpoint controllable three-dimensional image display apparatus.
Figure 6C:
FIG. 6C illustrates a translational shift of positions of a plurality of grating units of a first grating and positions of a plurality of grating units of a second grating relative to each other in some embodiments according to the present disclosure.
Figure 6C:
Figure 6C:
Figure 6C:
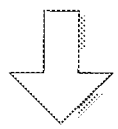
Figure 6C:
Figure 6C:
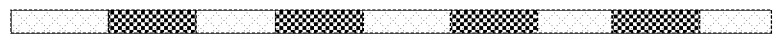
Figure 6C:

FIG. 6B is a schematic diagram illustrating the light path in a viewpoint controllable three-dimensional image display apparatus. Referring to FIG. 1 and FIG. 6B, in some embodiments, positions of a plurality of grating units of the first grating 300 and positions of a plurality of grating units of the second grating 400 are translationally shifted relative to each other so that the position of each individual view point of the plurality of second view points move towards the position of a respective, directly adjacent, first view point of the plurality of first view points. FIG. 6C illustrates a translational shift of positions of a plurality of grating units of a first grating and positions of a plurality of grating units of a second grating relative to each other in some embodiments according to the present disclosure. Referring to FIG. 6C, positions of a plurality of barriers in the second grating 400 are translationally shifted to the left, relative to positions of a plurality of barriers in the first grating 300. In this example, the positions of the plurality of barriers in the first grating 300 remain unchanged.

As a result, the distance between the first view point 1 of the plurality of first view points and the second view point 2 of the plurality of second view points is less than the width of a pupil q1. The distance between the third view point 3 of the plurality of first view points and the fourth view point 4 of the plurality of second view points is less than the width of a pupil q1. Accordingly, the first eye (e.g., a left eye) of the user can see two different images respectively corresponding to the first view points 1 of the plurality of first view points and the second view points 2 of the plurality of second view points, which presents three-dimensional image to the user based on the principle of light filed display. The second eye (e.g., a right eye) of the user can see two different images respectively corresponding to the third view point 3 of the first view points and the fourth view point 4 of the second view points, which presents three-dimensional image to the user based on the principle of light filed display.

Figure 6D:
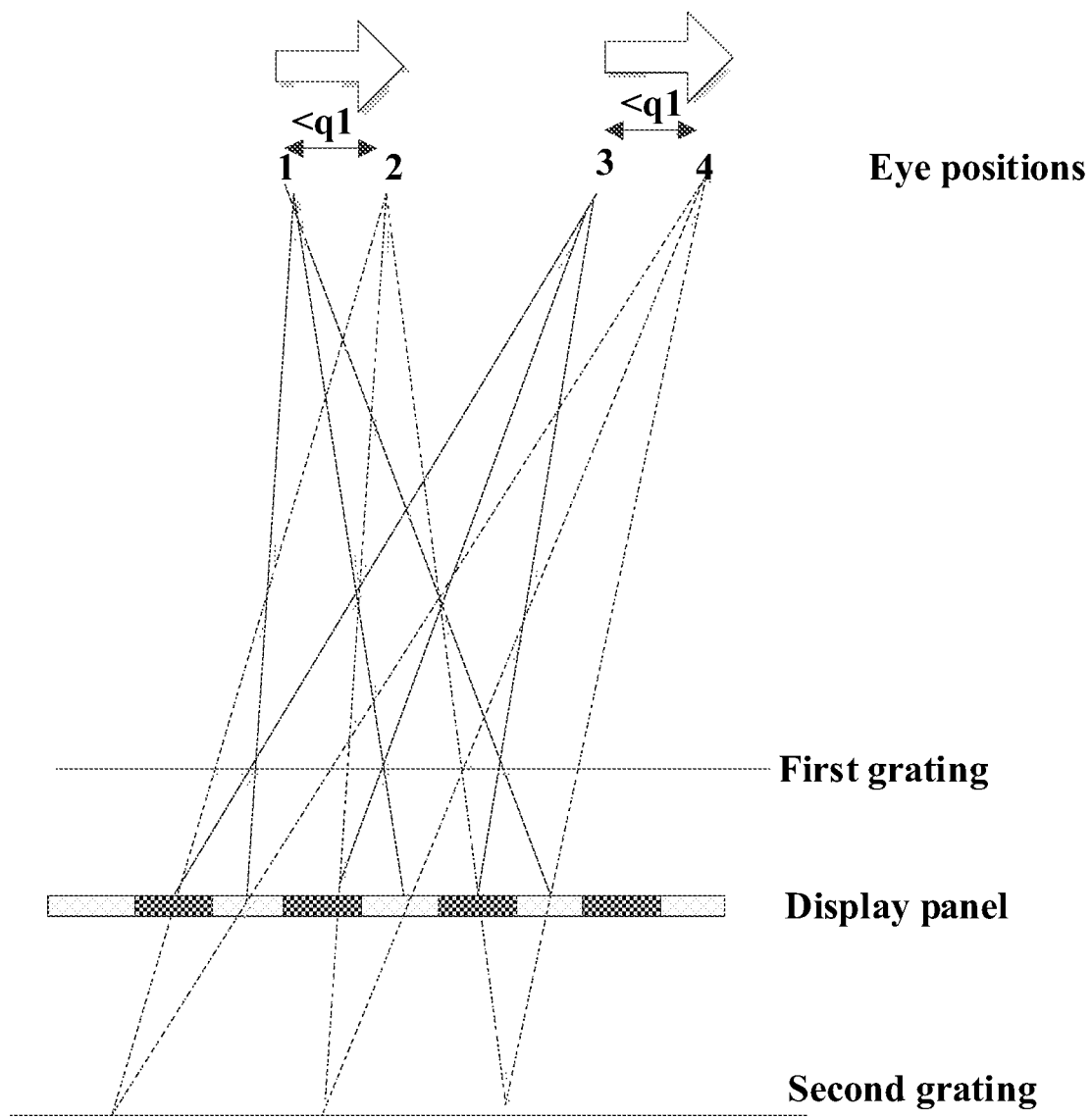
FIG. 6D is a schematic diagram illustrating the light path in a viewpoint controllable three-dimensional image display apparatus.
Figure 6E:
FIG. 6E illustrates a translational shift of positions of a plurality of grating units of a first grating and positions of a plurality of grating units of a second grating relative to each other in some embodiments according to the present disclosure.
Figure 6E:
Figure 6E:
Figure 6E:
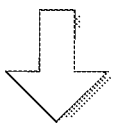
Figure 6E:
Figure 6E:
Figure 6E:

FIG. 6D is a schematic diagram illustrating the light path in a viewpoint controllable three-dimensional image display apparatus. Referring to FIG. 1 and FIG. 6D, in some embodiments, positions of a plurality of grating units of the first grating 300 and positions of a plurality of grating units of the second grating 400 are translationally shifted relative to each other so that the position of each individual view point of the plurality of first view points move towards the position of a respective, directly adjacent, second view point of the plurality of second view points. FIG. 6E illustrates a translational shift of positions of a plurality of grating units of a first grating and positions of a plurality of grating units of a second grating relative to each other in some embodiments according to the present disclosure. Referring to FIG. 6E, positions of a plurality of barriers in the first grating 300 are translationally shifted to the right, relative to positions of a plurality of barriers in the second grating 400. In this example, the positions of the plurality of barriers in the second grating 400 remain unchanged.

As a result, the distance between the first view point 1 of the plurality of first view points and the second view point 2 of the plurality of second view points is less than the width of a pupil q1. The distance between the third view point 3 of the plurality of first view points and the fourth view point 4 of the plurality of second view points is less than the width of a pupil q1. Accordingly, the first eye of the user can see two different images respectively corresponding to the first view points 1 of the plurality of first view points and the second view points 2 of the plurality of second view points, which presents three-dimensional image to the user based on the principle of light fled display. Similarly, the second eye of the user can see the two different images respectively corresponding to the third view point 3 of the first view points and the fourth view point 4 of the second view points, which presents three-dimensional image to the user based on the principle of light filed display.

The present viewpoint controllable three-dimensional image display apparatus is configured to adjust each of the first viewpoint spacing and the second view point spacing to be the interpupillary distance of a human. Optionally, the viewpoint controllable three-dimensional image display apparatus is configured to alternately turn on and off the first grating and the second grating in a time-division driving mode. Optionally, the viewpoint controllable three-dimensional image display apparatus is configured to adjust the first grating period of the first grating and adjust the second grating period of the second grating such that each view point of the plurality of first view points is spaced apart from one directly adjacent view point of the plurality of second view points by the distance less than the width of a pupil, and each view point of the plurality of second view points is spaced apart from one directly adjacent view point of the plurality of first view points by a distance less than the width of a pupil. Therefore, each eye of the user will receive two different images which present three-dimensional image to the user. The present three-dimensional image display apparatus can present three-dimensional image based on the principle of light field display by adjusting the first viewpoint spacing between two directly adjacent view points of the plurality of first view points and adjusting the second viewpoint spacing between two directly adjacent view points of the plurality of second view points.

Figure 7:
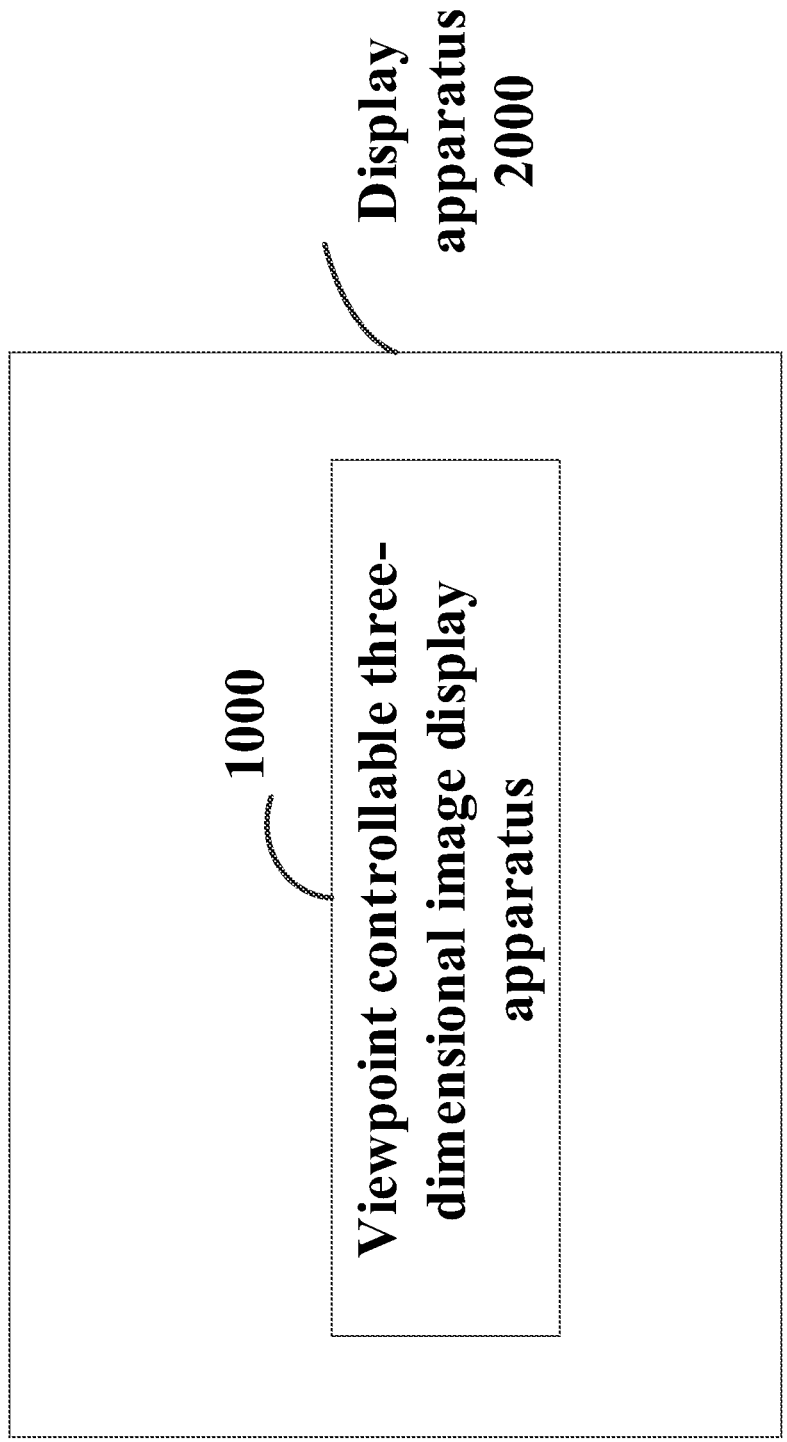
FIG. 7 is a schematic diagram illustrating the structure of a display apparatus.

FIG. 7 is a schematic diagram illustrating the structure of a display apparatus. Referring to FIG. 7, the display apparatus 2000 includes the viewpoint controllable three-dimensional image display apparatus 1000.

In some embodiments, the corresponding eye positions are where human's eyes locate, or where other similar devices locate, for example, a stereo camera.

In some embodiments, the controller can be a processor performing logical operations including the circuit devices having the capabilities of data processing and/or grogram execution, such as a Central Processing Unit (CPU), a field programmable logic array (FPGA), a digital signal processor (DSP), a single chip microcomputer (MCU), an application specific logic circuit (ASIC). In some embodiments, the controller can control and adjust the target object by communication connecting with the driving structure of the target object. In one example, the controller connects with the electrodes of a liquid crystal grating, thus the controller can adjust the liquid crystal grating by adjusting the voltage of the electrodes of liquid crystal grating.

In another aspect, the present disclosure provides a method for displaying a three-dimensional image. In some embodiments, the method includes alternately turning on and off the first grating and the second grating in a time-division driving mode comprising a first mode and a second mode, thereby presenting the three-dimensional image to a user. Optionally, in the first mode, the method includes turning off the second grating; turning on the first grating; and directing light emitted from the display panel into a plurality of first view points on a side of the first grating distal to the display panel, by turning on a first grating on a side the light emitting side distal to a back light. Optionally, in the second mode, the method includes turning on the second grating; turning off the first grating; and directing light emitted from the display panel into a plurality of second view points on a side of the first grating distal to the display panel, by turning on a second grating between the display panel and the back light.

In some embodiments, the method further includes adjusting a first viewpoint spacing between two directly adjacent view points of the plurality of first view points; and adjusting a second viewpoint spacing between two directly adjacent view points of the plurality of second view points.

In some embodiments, the method further includes adjusting a first height between the first grating and the display panel; and adjusting a second height between the second grating and the display panel. Optionally, the first height and the second height are adjusted so that a first normal distance between the plurality of first view points and the display panel is substantially same as a second normal distance between the plurality of second view points and the display panel.

In some embodiments, each of the first viewpoint spacing and the second viewpoint spacing is adjusted to be greater than a first spacing. Optionally, the method includes presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being directly adjacent to each other. Optionally, the method further includes adjusting each of the first viewpoint spacing and the second viewpoint spacing to be approximately twice that of the first spacing. Optionally, the method further includes adjusting a first grating period of the first grating and adjusting a second grating period of a second grating such that each view point of the plurality of first view points is spaced apart from any directly adjacent view point of the plurality of second view points by approximately the first spacing, and each view point of the plurality of second view points is spaced apart from any directly adjacent view point of the plurality of first view points by approximately the first spacing.

In some embodiments, the method further includes adjusting each of the first viewpoint spacing and the second viewpoint spacing to be less than a first spacing. Optionally, the method further includes presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being spaced apart by one or more view points.

In some embodiments, the method further includes adjusting each of the first viewpoint spacing and the second viewpoint spacing to be substantially same as a first spacing. Optionally, the method further includes adjusting a first grating period of the first grating and adjusting a second grating period of a second grating such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing. Optionally, the step of adjusting the first grating period of the first grating and adjusting the second grating period of a second grating includes moving a position of each individual view point of the plurality of second view points towards a position of a respective, directly adjacent, first view point of the plurality of first view points; and moving a position of each individual view point of the plurality of first view points towards a position of a respective, directly adjacent, second view point of the plurality of second view points.

Optionally, the first spacing is an interpupillary distance of a human.

Optionally, the second spacing is a width of a pupil.

Optionally, each of the first grating and the second grating comprises N independently controllable grating units, N is a positive integer.

Optionally, the first grating is a grating selected from a group consisting of a liquid crystal parallax barrier grating and a liquid crystal lens grating.

In another aspect, the present disclosure provides a method of fabricating a viewpoint controllable three-dimensional image display apparatus. In some embodiments, the method includes forming a display panel having a light emitting side; forming a back light as a light source for image display in the display panel; forming a first grating on a side of the light emitting side distal to the back light; forming a second grating between the display panel and the back light; and forming a controller configured to alternately turn on and off the first grating and the second grating, thereby presenting the three-dimensional image to a user. Optionally, the controller is formed to be operated in a time-division driving mode including a first mode and a second mode. In the first mode, the controller is configured to turn off the second grating and turn on the first grating, thereby directing light emitted from the display panel into a plurality of first view points on a side of the first grating distal to the display panel. In the second mode, the controller is configured to turn off the first grating, and turn on the second grating, thereby directing light emitted from the display panel into a plurality of second view points on a side of the first grating distal to the display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A viewpoint controllable three-dimensional image display apparatus, comprising:
    a display panel having a light emitting side;
    a back light for providing a light source for image display in the display panel;
    a first grating on a side of the light emitting side distal to the back light;
    a second grating between the display panel and the back light; and
    a controller configured to alternately turn on and off the first grating and the second grating in a time-division driving mode comprising a first mode and a second mode, thereby presenting a three-dimensional image to a user;
    wherein the controller is configured to turn off the second grating, and turn on the first grating, in the first mode, thereby directing light emitted from the display panel into a plurality of first view points on a side of the first grating distal to the display panel; and
    the controller is configured to turn off the first grating, and turn on the second grating, in the second mode, thereby directing light emitted from the display panel into a plurality of second view points on a side of the first grating distal to the display panel.

2. The viewpoint controllable three-dimensional image display apparatus of claim 1, wherein the controller is further configured to adjust a first viewpoint spacing between two directly adjacent view points of the plurality of first view points and a second viewpoint spacing between two directly adjacent view points of the plurality of second view points.

3. The viewpoint controllable three-dimensional image display apparatus of claim 2, wherein the controller is further configured to adjust each of the first viewpoint spacing and the second viewpoint spacing to be greater than a first spacing; and
the plurality of first view points and the plurality of second view points are configured to present a three-dimensional image to a user, when a first eye of the user is at a position corresponding to a first one of the plurality of first view points and a second eye of the user is at a position corresponding to a second one of the plurality of second view points, the first one of the plurality of first view points and the second one of the plurality of second view points being directly adjacent to each other.

4. The viewpoint controllable three-dimensional image display apparatus of claim 3, wherein the controller is further configured to adjust each of the first viewpoint spacing and the second viewpoint spacing to be approximately twice that of the first spacing.

5. The viewpoint controllable three-dimensional image display apparatus of claim 4, wherein the controller is further configured to adjust a first grating period of the first grating and adjust a second grating period of a second grating such that each view point of the plurality of first view points is spaced apart from any directly adjacent view point of the plurality of second view points by approximately the first spacing, and each view point of the plurality of second view points is spaced apart from any directly adjacent view point of the plurality of first view points by approximately the first spacing.

6. The viewpoint controllable three-dimensional image display apparatus of claim 3, wherein the first spacing is an interpupillary distance of a human.

7. The viewpoint controllable three-dimensional image display apparatus of claim 2, wherein the controller is further configured to adjust each of the first viewpoint spacing and the second viewpoint spacing to be less than a first spacing; and
the plurality of first view points and the plurality of second view points are configured to present a three-dimensional image to a user, when a first eye of the user is at a position corresponding to a first one of the plurality of first view points and a second eye of the user is at a position corresponding to a second one of the plurality of second view points, the first one of the plurality of first view points and the second one of the plurality of second view points being spaced apart by one or more view points.

8. The viewpoint controllable three-dimensional image display apparatus of claim 2, wherein the controller is further configured to adjust each of the first viewpoint spacing and the second viewpoint spacing to be substantially same as a first spacing; and
the controller is further configured to translationally shift positions of a plurality of grating units of the first grating and positions of a plurality of grating units of the second grating relative to each other such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing.

9. The viewpoint controllable three-dimensional image display apparatus of claim 8, wherein the controller is configured to translationally shift positions of a plurality of grating units of the first grating and positions of a plurality of grating units of the second grating relative to each other so that a position of each individual view point of the plurality of second view points move towards a position of a respective, directly adjacent, first view point of the plurality of first view points, and a position of each individual view point of the plurality of first view points move towards a position of a respective, directly adjacent, second view point of the plurality of second view points.

10. The viewpoint controllable three-dimensional image display apparatus of claim 8, wherein the second spacing is a width of a pupil.

11. The viewpoint controllable three-dimensional image display apparatus of claim 1, wherein the controller is further configured to adjust a first height between the first grating and the display panel, and a second height between the second grating and the display panel.

12. A method for displaying a three-dimensional image in a three-dimensional image display apparatus:
wherein the three-dimensional image display apparatus comprises:
a display panel having a light emitting side;
a back light for providing a light source for image display in the display panel;
a first grating on a side of the light emitting side distal to the back light; and
a second grating between the display panel and the back light; and
wherein the method comprises:
alternately turning on and off the first grating and the second grating in a time-division driving mode comprising a first mode and a second mode, thereby presenting the three-dimensional image to a user;
in the first mode, the method comprises:
turning off the second grating;
turning on the first grating; and
directing light emitted from the display panel into a plurality of first view points on a side of the first grating distal to the display panel, by turning on a first grating on a side the light emitting side distal to a back light;
in the second mode, the method comprises:
turning on the second grating;
turning off the first grating; and
directing light emitted from the display panel into a plurality of second view points on a side of the first grating distal to the display panel, by turning on a second grating between the display panel and the back light.

13. The method of claim 12, further comprising:
adjusting a first viewpoint spacing between two directly adjacent view points of the plurality of first view points; and
adjusting a second viewpoint spacing between two directly adjacent view points of the plurality of second view points.

14. The method of claim 13, wherein each of the first viewpoint spacing and the second viewpoint spacing is adjusted to be greater than a first spacing; and the method comprises presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being directly adjacent to each other.

15. The method of claim 14, further comprising adjusting each of the first viewpoint spacing and the second viewpoint spacing to be approximately twice that of the first spacing.

16. The method of claim 15, further comprising adjusting a first grating period of the first grating and adjusting a second grating period of a second grating such that each view point of the plurality of first view points is spaced apart from any directly adjacent view point of the plurality of second view points by approximately the first spacing, and each view point of the plurality of second view points is spaced apart from any directly adjacent view point of the plurality of first view points by approximately the first spacing.

17. The method of claim 13, further comprising adjusting each of the first viewpoint spacing and the second viewpoint spacing to be less than a first spacing; and
   presenting a three-dimensional image to a user by the plurality of first view points and the plurality of second view points, when a first eye of the user is at a position corresponding to a first one of the plurality of first view points and a second eye of the user is at a position corresponding to a second one of the plurality of second view points, the first one of the plurality of first view points and the second one of the plurality of second view points being spaced apart by one or more view points.

18. The method of claim 13, further comprising adjusting each of the first viewpoint spacing and the second viewpoint spacing to be substantially same as a first spacing; and
   adjusting a first grating period of the first grating and adjusting a second grating period of a second grating such that each view point of the plurality of first view points is spaced apart from one directly adjacent view point of the plurality of second view points by a distance less than a second spacing, and each view point of the plurality of second view points is spaced apart from one directly adjacent view point of the plurality of first view points by a distance less than the second spacing.

19. The method of claim 12, further comprising:
   adjusting a first height between the first grating and the display panel; and
   adjusting a second height between the second grating and the display panel.

20. The method of claim 19, wherein the first height and the second height are adjusted so that a first normal distance between the plurality of first view points and the display panel is substantially same as a second normal distance between the plurality of second view points and the display panel.

* * * * *